United States Patent
Kalari (10) Patent No.: US 12,067,465 B2
(45) Date of Patent: Aug. 20, 2024

(54) INSTRUCTION STREAMING FOR A MACHINE LEARNING ACCELERATOR

(71) Applicant: SiMa Technologies, Inc., San Jose, CA (US)

(72) Inventor: Subba Rao Venkata Kalari, Cupertino, CA (US)

(73) Assignee: SiMa Technologies, Inc., San Jose, CA (US)

( * ) Notice: Subject to any disclaimer, the term of this patent is extended or adjusted under 35 U.S.C. 154(b) by 916 days.

(21) Appl. No.: 17/125,993

(22) Filed: Dec. 17, 2020

(65) Prior Publication Data

US 2022/0198318 A1 Jun. 23, 2022

(51) Int. Cl.
*G06N 20/00* (2019.01)
*G06F 9/38* (2018.01)
(Continued)

(52) U.S. Cl.
CPC .......... *G06N 20/00* (2019.01); *G06F 9/3836* (2013.01); *G06F 9/4881* (2013.01);
(Continued)

(58) Field of Classification Search
CPC .......... G06N 20/00; G06N 3/04; G06N 3/082; G06N 3/063; G06F 9/3836; G06F 9/4881;
(Continued)

(56) References Cited

U.S. PATENT DOCUMENTS 4,709,327 A * 11/1987 Hillis ................. G06F 15/8023
712/208
5,765,037 A * 6/1998 Morrison ................. G06F 8/45
712/E9.082

(Continued)

OTHER PUBLICATIONS

International Search Report and Written Opinion, Patent Cooperation Treaty Application No. PCT/US2021/063756, May 13, 2022, 15 pages.
(Continued)

*Primary Examiner* — Farley Abad
(74) *Attorney, Agent, or Firm* — Fenwick & West LLP (57) ABSTRACT

A machine learning network is implemented by executing a computer program of instructions on a machine learning accelerator (MLA) comprising a plurality of interconnected storage elements (SEs) and processing elements (PEs. The instructions are partitioned into blocks, which are retrieved from off-chip memory. The block includes a set of deterministic instructions to be executed by on-chip storage elements and/or processing elements according to a static schedule. The block also includes the number of non-deterministic instructions to be executed prior to executing the set of deterministic instructions in this block. These non-deterministic instructions may be instructions for storage elements to retrieve data from off-chip memory and are contained in one or more prior blocks. The execution of these non-deterministic instructions is counted, for example through the use of tokens. The set of deterministic instructions in the current block is not executed until the count reaches the number provided in the block.

20 Claims, 11 Drawing Sheets

(51) Int. Cl.
  *G06F 9/48* (2006.01)
  *G06F 9/50* (2006.01)
(52) U.S. Cl.
  CPC .......... *G06F 9/5027* (2013.01); *G06F 9/5061* (2013.01); *G06F 9/5066* (2013.01)
(58) Field of Classification Search
  CPC .... G06F 9/5027; G06F 9/5061; G06F 9/5066; G06F 9/38
  See application file for complete search history.

(56) References Cited

U.S. PATENT DOCUMENTS

| | | | | |
|---|---|---|---|---|
| 6,061,781 | A * | 5/2000 | Jain | G06F 9/3861 708/650 |
| 6,453,424 | B1 * | 9/2002 | Janniello | G06F 9/3836 713/400 |
| 7,275,149 | B1 * | 9/2007 | Subramanian | G06F 9/00 712/226 |
| 9,928,460 | B1 | 3/2018 | Nowatzyk et al. | |
| 10,585,716 | B2 | 3/2020 | Knowles | |
| 10,685,295 | B1 | 6/2020 | Ross et al. | |
| 11,016,801 | B1 * | 5/2021 | Sodani | G06F 9/30174 |
| 2010/0313000 | A1 * | 12/2010 | Walker | G06F 9/3001 712/E9.017 |
| 2012/0144376 | A1 * | 6/2012 | Van Eijndhoven | G06F 8/456 717/146 |
| 2019/0004878 | A1 | 1/2019 | Adler et al. | |
| 2019/0018815 | A1 | 1/2019 | Fleming et al. | |
| 2019/0073225 | A1 * | 3/2019 | Mace | G06F 9/3851 |
| 2019/0076031 | A1 | 3/2019 | Valys et al. | |
| 2019/0138373 | A1 | 5/2019 | Nicol et al. | |
| 2019/0155768 | A1 | 5/2019 | Wilkinson et al. | |
| 2019/0205745 | A1 | 7/2019 | Sridharan et al. | |
| 2019/0213160 | A1 | 7/2019 | Asghar | |
| 2019/0286973 | A1 | 9/2019 | Kovvuri et al. | |
| 2019/0287017 | A1 | 9/2019 | Esmaeilzadeh et al. | |
| 2019/0303346 | A1 | 10/2019 | Brewer | |
| 2019/0303518 | A1 | 10/2019 | Drego et al. | |
| 2019/0391796 | A1 | 12/2019 | Brady et al. | |
| 2020/0007342 | A1 | 1/2020 | Liem et al. | |
| 2020/0012536 | A1 | 1/2020 | Lacey et al. | |
| 2020/0012537 | A1 | 1/2020 | Lacey et al. | |
| 2020/0065073 | A1 | 2/2020 | Pan et al. | |
| 2020/0073830 | A1 | 3/2020 | Verrilli et al. | |
| 2020/0090383 | A1 | 3/2020 | Dwivedi | |
| 2020/0133914 | A1 | 4/2020 | Wilkinson et al. | |
| 2020/0150713 | A1 | 5/2020 | Knowles et al. | |
| 2020/0341807 | A1 | 10/2020 | Xu et al. | |
| 2021/0011846 | A1 * | 1/2021 | Venkatesh | G06N 3/063 |
| 2021/0026686 | A1 * | 1/2021 | Sakharshete | G06F 12/0893 |
| 2021/0157593 | A1 * | 5/2021 | Gu | G06F 9/5027 |
| 2021/0173648 | A1 | 6/2021 | Lo et al. | |
| 2021/0181974 | A1 * | 6/2021 | Ghosh | G06F 3/0611 |
| 2021/0201526 | A1 | 7/2021 | Moloney et al. | |
| 2021/0374607 | A1 | 12/2021 | Kazakov et al. | |
| 2022/0092408 | A1 | 3/2022 | Khaitan | |

OTHER PUBLICATIONS

United States Office Action, U.S. Appl. No. 17/315,225, filed Oct. 19, 2022, 32 pages.
Andri et al., "YodaNN: An Architecture for Ultralow Power Binary-Weight CNN Acceleration", IEEE Transactions On Computer-Aided Design of Integrated Circuits and Systems, vol. 37, No. 1, Jan. 2018, pp. 48-60.
Ankit et al., "Puma: A Programmable Ultra-efficient Memristor-based Accelerator for Machine Learning Inference", ASPLOS'19, Apr. 13-17, 2019, Providence, RI, USA, pp. 715-731.
Du et al., "ShiDianNao: Shifting Vision Processing Closer to the Sensor", ISCA'15, Jun. 13-17, 2015, Portland, OR, USA, pp. 92-104.
Everson et al., "A 104.8TOPS/W One-Shot Time-Based Neuromorphic Chip Employing Dynamic Threshold Error Correction in 65nm", IEEE Asian Solid-State Circuits Conference Nov. 5-7, 2018/Tainan, Taiwan, pp. 273-276.
Guha, A. et al., "Deepframe: A Profile-Driven Compiler for Spatial Hardware Accelerators," 2019 28th International Conference on Parallel Architectures and Compilation Techniques (PACT), Sep. 23-26, 2019, pp. 68-81.
Jiao et al., "A 12nm Programmable Convolution-Efficient Neural-Processing-Unit Chip Achieving 825TOPS", ISSCC 2020, Session 7, Feb. 18, 2020, 5 pages.
Reuther et al., "Survey and Benchmarking of Machine Learning Accelerators", 2019 IEEE High Performance Extreme Computing Conference (HPEC) Sep. 24-26, 2019, pp. 1-9.
Shawahna et al., "FPGA-Based Accelerators of Deep Learning Networks for Learning and Classification: A Review", IEEE Access, vol. 7, 2019, pp. 7823-7858.

* cited by examiner

BLOCK 1

| | | | | | |
|---|---|---|---|---|---|
| Header | | Block size = 5 instructions | | | |
| | | Token count for block = 0 | | | |
| | | Block duration = 5 cycles | | | |
| Ref | Dest | Instruction | Cycle | Type | Token dest |
| 1 | SE (N, 4) | Load data from DRAM | 1 | ND | block 2 |
| 2 | SE (S, 5) | Load data from DRAM | 2 | ND | block 2 |
| 3 | SE (E, 6) | Load data from DRAM | 3 | ND | block 3 |
| 4 | PE (7, 5) | Setup | 3 | D | |
| 5 | PE (1, 3) | Setup | 3 | D | |

BLOCK 2

| | | | | | |
|---|---|---|---|---|---|
| Header | | Block size = 9 instructions | | | |
| | | Token count for block = 2 | src = block 1 | | |
| | | Block duration = 760 cycles | | | |
| Ref | Dest | Instruction | Cycle | Type | Token dest |
| 1 | SE (S, 5) | Transfer data to PE (7, 5) | 1 | D | |
| 2 | SE (N, 4) | Transfer data to PE (1, 3) | 1 | D | |
| 3 | PE (5, 5) | Setup | 5 | D | |
| 4 | PE (5, 5) | Setup | 10 | D | |
| 5 | PE (7, 5) | Compute | 111 | D | |
| 6 | PE (1, 3) | Compute | 234 | D | |
| 7 | PE (1, 3) | Transfer data to SE (W, 7) | 462 | D | |
| 8 | PE (7, 5) | Transfer data to PE (5, 5) | 539 | D | |
| 9 | SE (W, 7) | Store data in DRAM | 732 | ND | block 4 |

BLOCK 3

| | | | | | |
|---|---|---|---|---|---|
| Header | | Block size = 4 instructions | | | |
| | | Token count for block = 1 | src = block 1 | | |
| | | Block duration = 670 cycles | | | |
| Ref | Dest | Instruction | Cycle | Type | Token dest |
| 1 | SE (E, 6) | Transfer data to PE (5, 5) | 1 | D | |
| 2 | PE (5, 5) | Compute | 210 | D | |
| 3 | PE (5, 5) | Transfer data to SE (S, 9) | 384 | D | |
| 4 | SE (S, 9) | Store data in DRAM | 639 | ND | block 4 |

BLOCK 4

| | | |
|---|---|---|
| Header | | Block size = 0 instructions |
| | | Token count for block = 2 | src = blocks 3, 4 |
| | | Block duration = 1 cycle |

INSTRUCTION STREAMING FOR A MACHINE LEARNING ACCELERATOR

BACKGROUND

1. Technical Field

This disclosure relates generally to the implementation of machine learning networks on hardware, and more particularly to the streaming and execution of statically scheduled instructions.

2. Description of Related Art

Machine learning is one of the most powerful recent trends in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether (or to what confidence level) objects are present within the images.

Machine learning networks typically require the handling of a large volume of data and the execution of a large number of computations. As a result, they are commonly implemented in compute facilities with access to significant resources, such as in the cloud or on server clusters. However, the sources of input to machine learning networks may be located remotely from these compute facilities. For example, cameras and other types of sensors may be edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time. In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. Thus, one common paradigm is for the input sources to be web-based so that they can continuously send their captured data to the cloud-based compute facility, which then executes the machine learning network and returns the result.

There can be many advantages if the machine learning network was instead embedded on edge devices, such as combined with the camera system. However, many types of edge devices (e.g., cameras) have resource limitations (e.g., limited memory, power consumption, etc.). As a result, on-chip processing elements may be simplified to conserve resources, but this may give rise to a need to coordinate the streaming of data and instruction from off-chip.

BRIEF DESCRIPTION OF THE DRAWINGS

Embodiments of the disclosure have other advantages and features which will be more readily apparent from the following detailed description and the appended claims, when taken in conjunction with the example embodiments in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A Machine Learning Accelerator (MLA) is described herein that may be built into an edge device. The MLA executes a machine learning network (MLN). As will be described in more detail below, one method of optimizing execution of an MLN is to use a compiler that, prior to run-time, generates a computer program with statically scheduled instructions for executing the MLN. For example, the compiler may determine which instructions are executed by which processing elements in the MLA at what time. Static scheduling enables one or more processing elements in the MLA to execute the instructions with no run-time conditions, branching or dependencies. This may result in lower power consumption, simpler MLA design, and lower cost.

However, because on-chip memory accessible by the processing elements is limited, the statically scheduled instructions and corresponding data may be stored in off-chip memory and then transferred to on-chip storage elements for consumption by the processing elements. On-chip memory such as SRAM has a known access time, so data transfers from SRAM storage elements to and from processing elements may be statically scheduled. However, SRAM typically has limited space.

Off-chip memory such as DRAM has much more space available, but it has variable access time, so the compiler may not be able to predict when the instructions or corresponding data fetched from the off-chip memory are ready for execution and cannot statically schedule data transfers from DRAM. This issue may be compounded if instructions are to be executed by multiple processing elements according to a common static schedule because the processing elements must be synchronized in their operation. One processing element cannot start execution of its statically scheduled instructions later than another processing element, just because its instructions or data arrived later.

In one approach, to facilitate execution, the compiler may group instructions into blocks. The instructions in a block include a set of deterministic instructions—instructions whose timing is predictable enough to be statically scheduled, such as instructions for on-chip processing elements to perform data computations, and instructions to transfer data between on-chip processing elements and/or on-chip storage elements. The instructions in a block may also include non-deterministic instructions—instructions whose timing is too variable to be statically scheduled, such as instructions to transfer data between the on-chip storage elements and the off-chip memory. The set of deterministic instructions in a block are statically scheduled (i.e., have deterministic start times) with respect to each other, because the execution time of these instructions can be reliability predicted. The compiler may also schedule the start of execution of non-deterministic instructions, even if the execution time of these instructions is not predictable enough to reliably predict when they will complete execution. The set of deterministic instructions in each block of instructions may be dependent on the execution of non-deterministic instructions in previous blocks, such as instructions for fetching data from the off-chip memory to the on-chip storage elements for use by the deterministic instructions. Because the compiler may not be able to predict when the non-deterministic instructions are completed, it is advantageous to efficiently bridge execution of the non-deterministic instructions and the deterministic instructions.

In one approach, a block of instructions is retrieved from off-chip memory. The block includes a set of statically scheduled deterministic instructions to be executed by on-chip storage elements and/or processing elements according to a static schedule. The block also includes the number of non-deterministic instructions to be executed prior to executing the set of deterministic instructions in this block. These non-deterministic instructions may be instructions for storage elements to retrieve data from off-chip memory and are contained in one or more prior blocks. The execution of these non-deterministic instructions is counted, for example through the use of tokens. The set of instructions in the current block is not executed until the count reaches the number provided in the block.

Figure 1A:
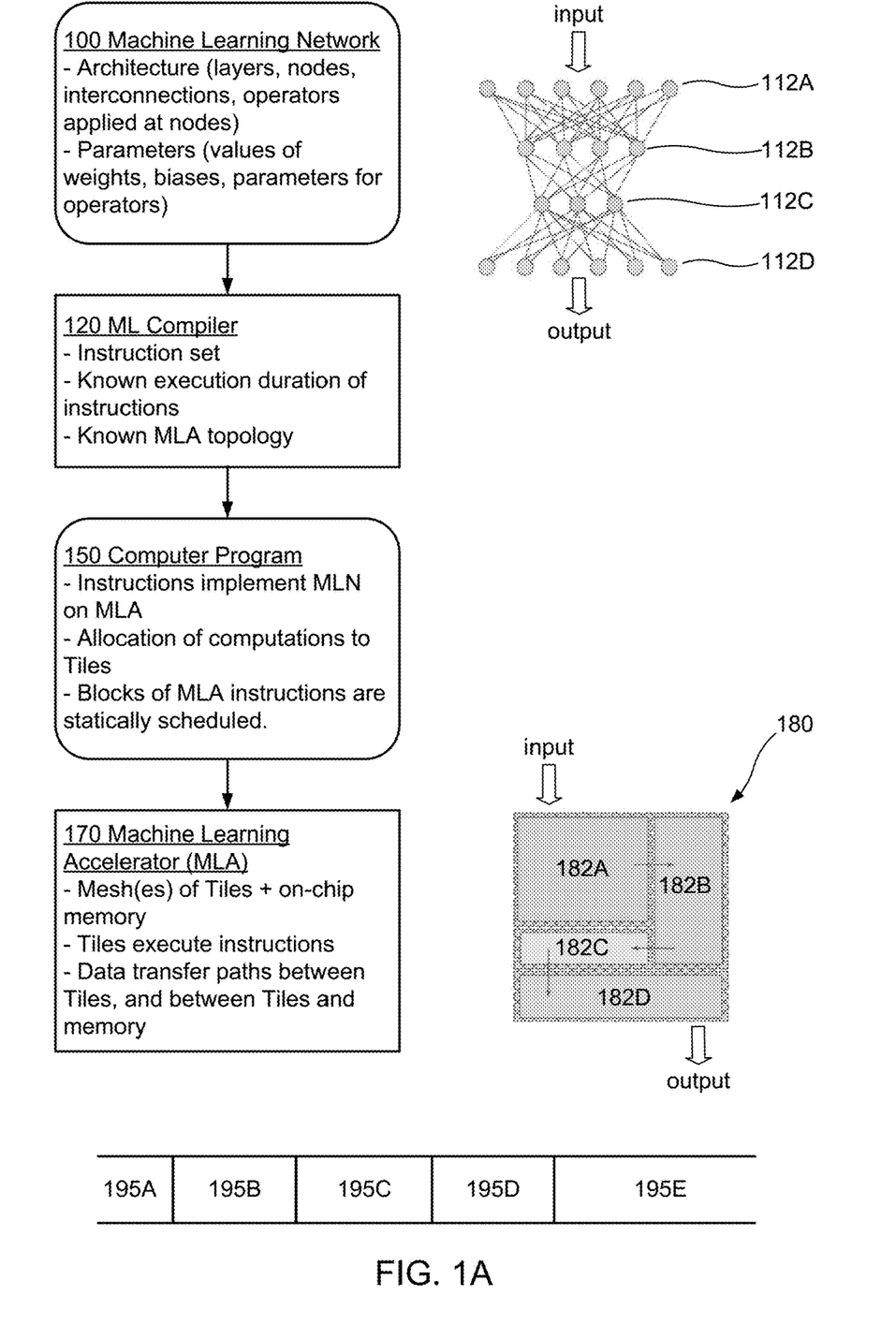
FIG. 1A is a block diagram of a system with a machine learning accelerator (MLA) and corresponding compiler.

FIG. 1A is a block diagram of a system with a machine learning accelerator (MLA) and corresponding compiler. As discussed above, an MLA may be part of an edge device. The MLA may be executing both non-deterministic and deterministic instructions. The compiler 120 receives a description of a machine learning network 100 and generates a computer program 150 that implements the machine learning network using MLA 170. The computer program 150 includes instructions that are executed by processing elements (Tiles) and/or storage elements in the MLA according to a schedule determined by the compiler. The compiler 120 partitions the instructions into blocks, which may include both deterministic and non-deterministic instructions. A set of deterministic instructions in a block may be statically scheduled with respect to each other. A set of deterministic instructions may be statically scheduled because the compiler can determine which instructions are executed by which elements at what times, as will be explained in greater detail below. For example, for the statically scheduled instructions, there are no conditions, branching or data dependencies that can be resolved only at run-time, and which would affect the timing and order of the execution of the instructions. Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

Figure 1B:
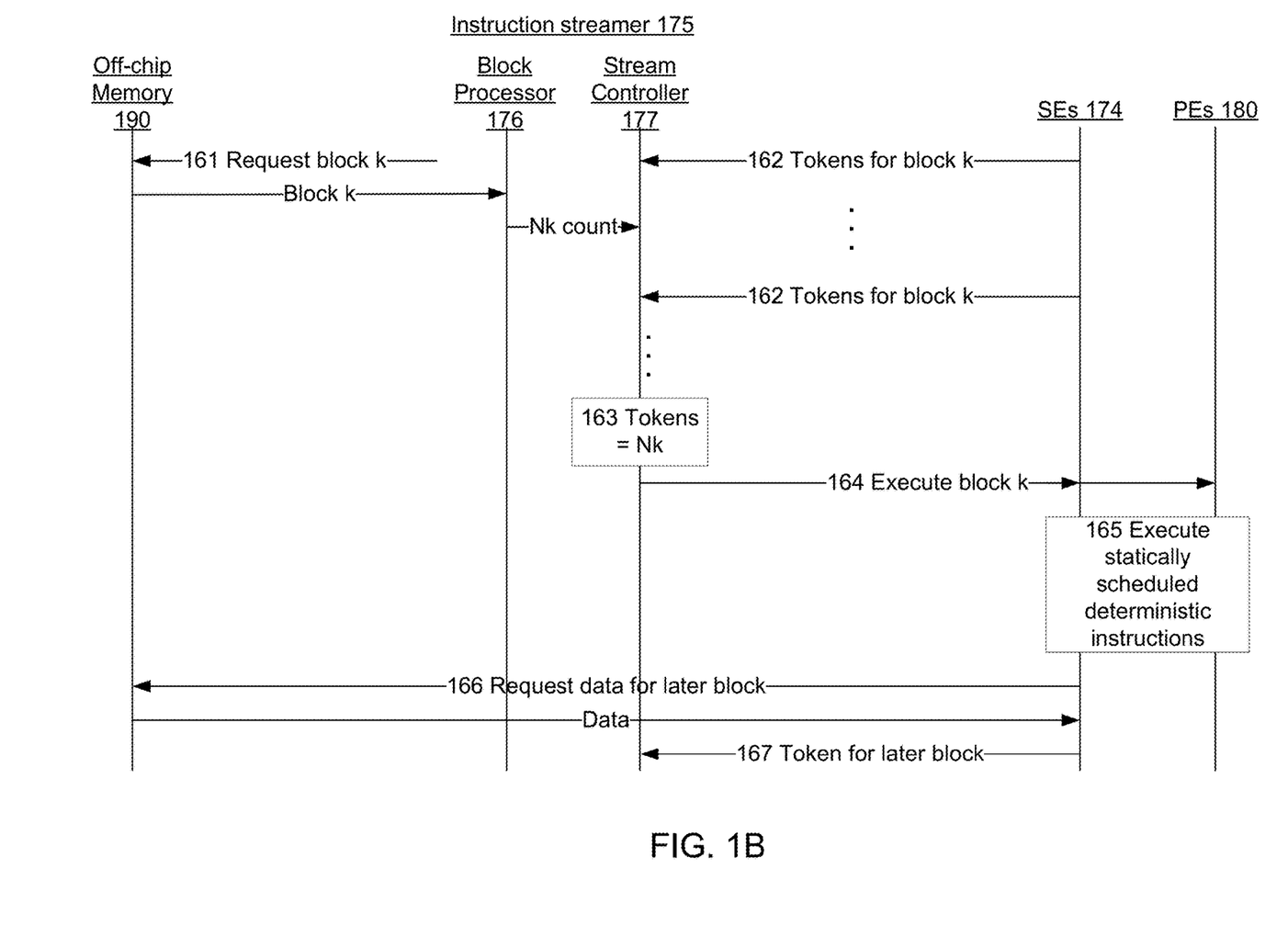
FIG. 1B is an event trace illustrating coordination of non-deterministic and deterministic instructions using blocks.

In more detail, the MLN 100 may be described by an architecture and parameters. A depiction of an MLN is shown to the right of box 100 in FIG. 1B. Most MLNs include multiple layers 112, each with one or more nodes which are represented by circles in FIG. 1B. The lines between nodes in FIG. 1B represent interconnections between the nodes (and layers). Each node calculates a weighted sum of the values received from its connected nodes, possibly also applying a bias. Examples are matrix multiplication and convolution. Each node may also apply certain functionality (operators), such as nonlinear functions (e.g., tan h function), softmax operator, etc. A typical node may compute an output:

$$y = F(\Sigma w_i x_i + b) \qquad (1)$$

where $x_i$ are the inputs received from other nodes i, $w_i$ are weights, b is a bias and F( ) is a nonlinear operator. The MLN architecture includes the number of nodes (and layers) and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 100 or more layers. Examples of inputs include text, images and video. Some of the layers may be fully interconnected (i.e., every node in one layer provides input to every node in the next layer), and others may be more locally interconnected (e.g., to implement convolutions). Each weighted interconnect represents a scalar multiplication. The total number of scalar multiplications required to implement an MLN may be on the order of millions, billions, tens of billions or even more. These may be carried out by matrix multiplications.

The MLA 170 includes a plurality of Tiles 180 and an on-chip memory system with storage elements (not shown in FIG. 1A) implemented on a semiconductor die. The Tiles are organized into one or more meshes of interconnected Tiles. A depiction of a Tile mesh is shown to the right of box 170 in FIG. 1B. In each mesh, the Tiles 180 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., non-linear functions, lookup table, min/max, pooling). These are computations that implement the MLN. In the example of FIG. 1B, the computations performed by layers 112A-D are allocated to groups 182A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 120 receives a description of the MLN 100 and generates a computer program 150 that implements the MLN using the MLA 170. The computer program 150 receives an input sample for the MLN and executes the operations of the MLN to produce the output for the MLN. The computer program 150 includes instructions to be executed by the Tiles for implementing computations in the MLN and may also include instructions to be executed by other elements, such as a controller outside the Tiles. For additional examples and description of the MLA and related components, see U.S. application Ser. No. 16/840,216, "Machine Learning Network Implemented by Statically Scheduled Instructions, with Compiler," which is incorporated by reference herein in its entirety.

As shown at the bottom of FIG. 1A, the compiler 150 partitions the instructions into blocks 195 of instructions. Each block 195 typically has a set of statically scheduled deterministic instructions that are executed by processing elements and/or storage elements in the MLA. Blocks may also include non-deterministic instructions, such as fetching data from off-chip memory. The set of statically scheduled instructions in a block may depend on non-deterministic instructions in previous blocks. For example, computations performed by Tiles may depend on data retrieved from off-chip memory. In one approach, the block 195 also specifies the number of non-deterministic instructions that must execute prior to the current block of instructions. For nomenclature, this number will be referred to as Nk for a block k. A count of executed non-deterministic instructions is maintained. When the count reaches Nk for block k, then the instructions in block k may be executed. For example, the Tile computations may be executed because it is known that any required data has been retrieved from off-chip memory.

Returning to FIG. 1A, the set of deterministic instructions in a block may include a series of computations required to implement a portion of the MLN, where the time required for each computation and associated data transfers is known. As a result, the compiler may statically schedule the Tile instructions within that set relative to the other Tile instructions in the set. The resulting computer program produced by the compiler then implements an allocation of instructions to Tiles and a schedule for executing the instructions as determined by the compiler, although these may not be expressly contained with the computer program. In the example of FIG. 1A, the computations performed by layers 112A-D are allocated to groups 182A-D of Tiles as indicated.

The computer program may also include non-deterministic instructions. For example, non-deterministic instructions may include data fetch from off-chip memory where the time required to execute the operation varies too much to allow reliable synchronization with other operations. Other examples include computations that occur off-chip, and conditions, branching and other programmatic constructs that depend on values not known until run-time.

FIG. 1B is an event trace illustrating coordination of non-deterministic and deterministic instructions using blocks. In this example, the MLA 170 includes storage elements 174 such as SRAM, processing elements 180 (Tiles), and an instruction streamer 175. The instruction streamer handles the processing of blocks and includes a block processor 176 and a stream controller 177. These will be described in more detail below. The overall system also includes off chip memory 190, such as DRAM.

The event trace of FIG. 1B begins by requesting 161 a block k from off chip memory 190. The block k is retrieved to the MLA and processed by instruction streamer 175. The block processor 176 receives the block. The block includes a set of statically scheduled deterministic instructions and may also include non-deterministic instructions. The block processor 176 places the instructions into queues. The block also specifies a count Nk of non-deterministic instructions that must execute prior to execution of the instructions in block k. These non-deterministic instructions are contained in prior blocks. The block k may also specify the duration for execution of the statically scheduled deterministic instructions in the block.

The stream controller 177 controls streaming of the instructions from block k. It receives the count Nk from the block processor 176. It also receives 162 tokens produced as the corresponding non-deterministic instructions are executed and maintains a count of these tokens. In this example, the non-deterministic instructions are executed by the storage elements 174 and retrieve data required for the statically scheduled instructions in block k. The tokens for block k may be received even before block k itself is received. When the count of tokens for block k reaches Nk 163, the stream controller 177 may start execution 164 of the instructions in block k. This includes execution 165 of the statically scheduled deterministic instructions in block k, because the stream controller knows that all required non-deterministic instructions have already been executed.

Block k may also include non-deterministic instructions to be executed by the storage elements 174 for later blocks. On execution of block k, the storage elements 174 request 166 data from the off chip memory 190. When the storage element receives the data, it sends 167 a token for the later block to the stream controller 177, which then adds to the token count for that later block.

Figure 1C:
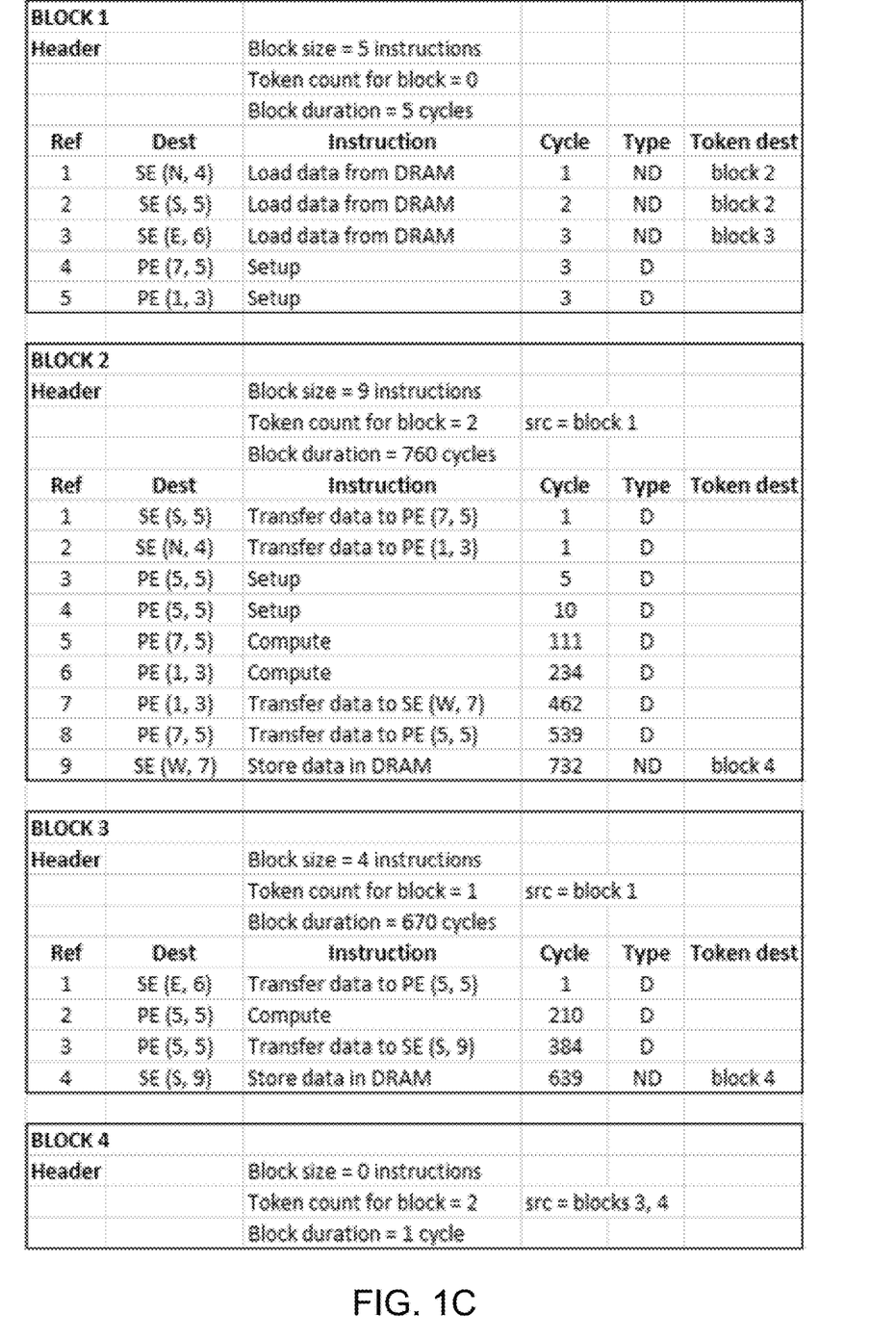
FIG. 1C is a simplified example using four blocks of instructions.

FIG. 1C is a simplified example using four blocks of instructions, labelled BLOCKS 1-4. Each block includes a header and a body of instructions. The header includes a block size which specifies the number of instructions in the block, the token count Nk for the block (and the source of those tokens), and a block duration which specifies the number of cycles required to execute the statically scheduled deterministic instructions in the block. The instructions are described in six columns. The Ref column is a reference number for each of the instructions. The Dest(ination) column lists the storage element (SE) or processing element (PE) that executes the instruction. The Instruction column contains the instruction. The Cycle column is the schedule for executing the instructions in the block. The Type column indicates whether the instruction is deterministic (D) or non-deterministic (ND). For non-deterministic instructions, the Token dest column indicates which block is dependent on that non-deterministic instruction.

For example, in block 1, instructions 4, 5 are the statically scheduled deterministic instructions. Instructions 1, 2, 3 are non-deterministic instructions which load data from off-chip memory for use by blocks 2 and 3. Therefore, the header for block 1 specifies a block size of 5 instructions, token count N1=0, and the statically scheduled deterministic instructions 4, 5 will complete execution by the end of cycle 5. It is a short duration, because block 1 is setup without any computation. The Cycle column indicates that once block 1 begins execution, instruction 1 will be released in cycle 1, instruction 2 will be released in cycle 2, and instructions 3, 4, 5 will all be released in cycle 3.

Since N1=0 for block 1, it may start execution immediately. Instructions 1, 2, 3 retrieve data for blocks 2 and 3. Each of these instructions generates a token once the data is retrieved.

Block 2 has N2=2, referring to instructions 1, 2 from block 1, as indicated by src=block 1. Before the statically scheduled deterministic instructions 1-8 of block 2 can execute, the required data must have been retrieved from DRAM. Specifically, instruction 1 in block 2 is dependent on instruction 2 in block 1, and instruction 2 in block 2 is dependent on instruction 1 in block 1. The MLA counts tokens for block 2 as instructions 1, 2 from block 1 execute. When the token count reaches N2=2, then block 2 may execute. In block 2, the statically scheduled instructions are instructions 1-8. Instruction 9 is a non-deterministic instruction for block 4. The block duration is longer than for block 1, because some computation is performed in block 2.

Block 3 has N3=1, referring to instruction 3 from block 1. Block 3 has deterministic instructions 1-3 and non-deterministic instruction 4 for block 4. Block 4 does not have any instructions, but it has N4=2, referring to instruction 9 from block 2 and instruction 4 from block 3. Once these instructions complete execution, block 4 can execute to signal completion of the program.

Figure 2:
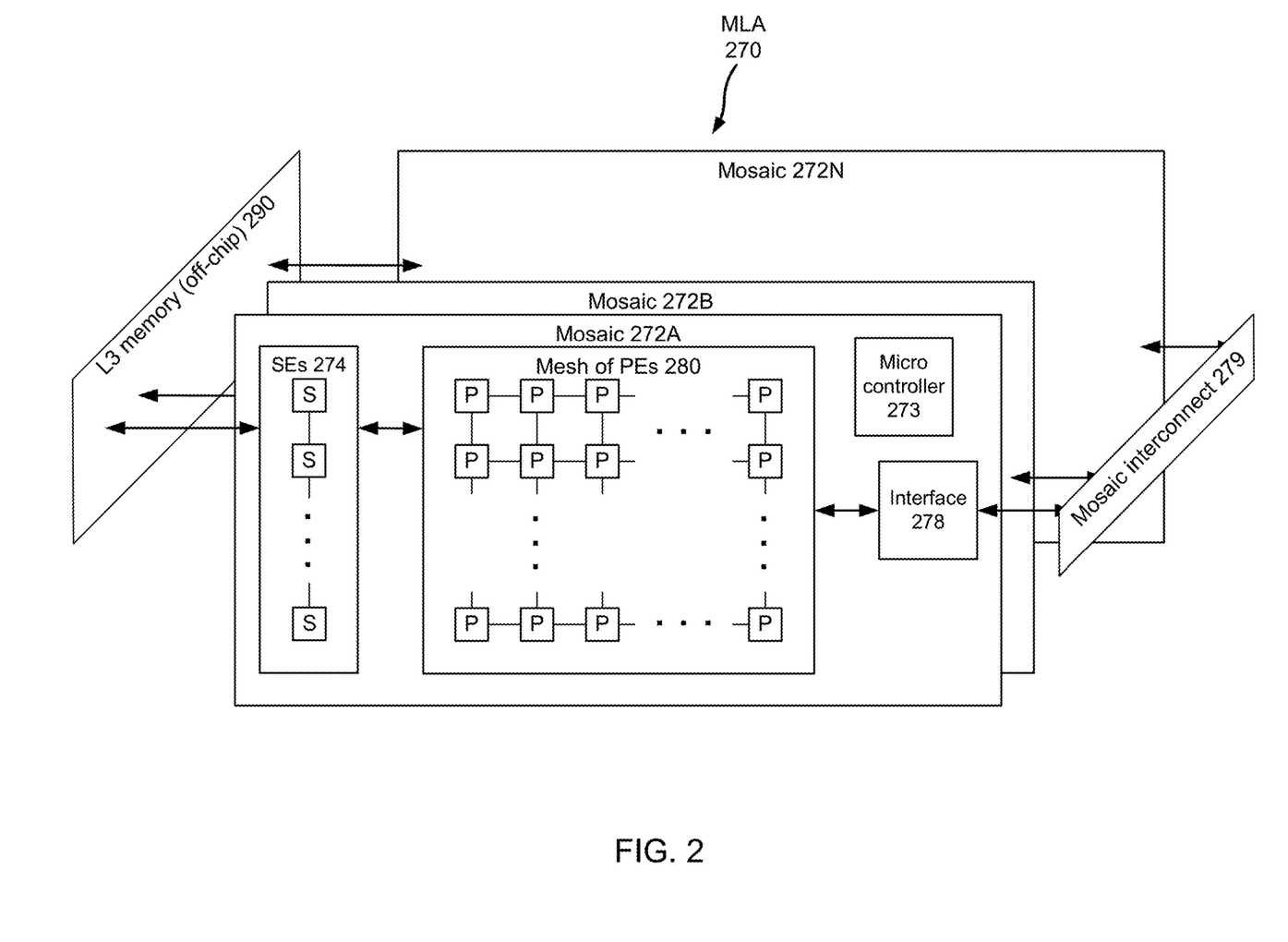
FIG. 2 is a block diagram of a hardware system including an MLA.
Figure 3A:
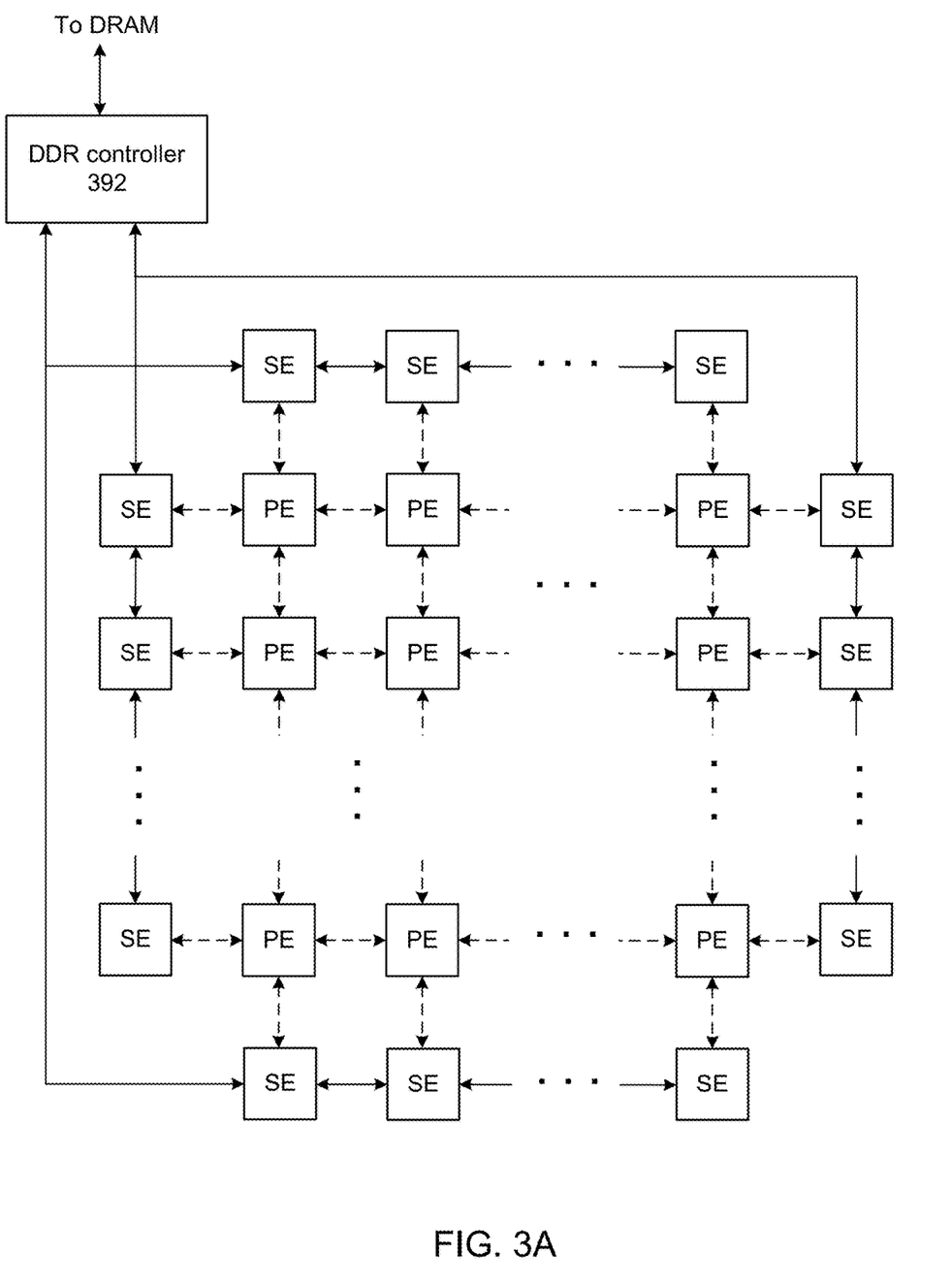
FIG. 3A is a block diagram of an instruction streamer, processing elements (PEs) and storage elements (SEs) within an MLA, showing data paths.
Figure 3B:
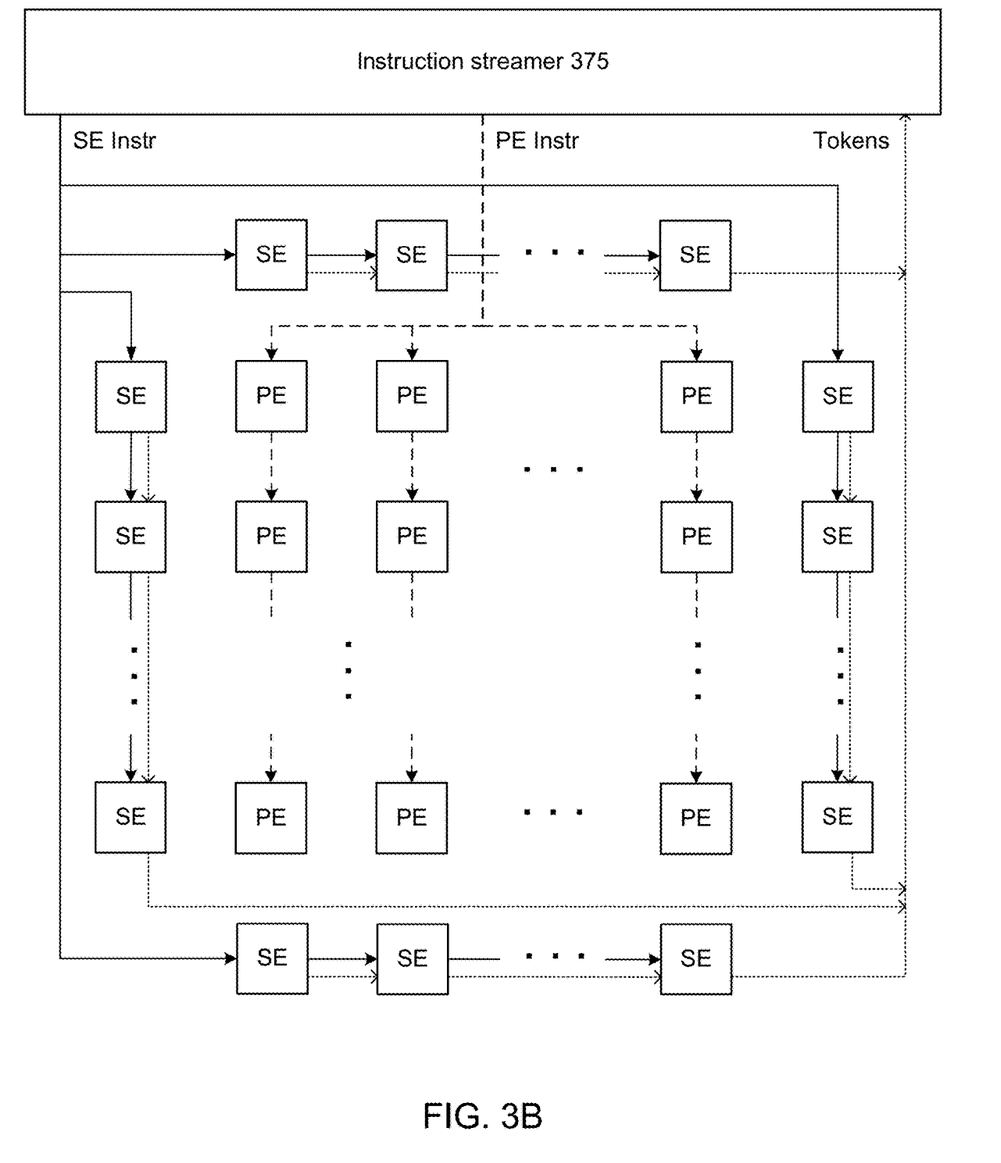
FIG. 3B is a block diagram of an instruction streamer, processing elements (PEs) and storage elements (SEs) within an MLA, showing instruction paths.
Figure 3C:
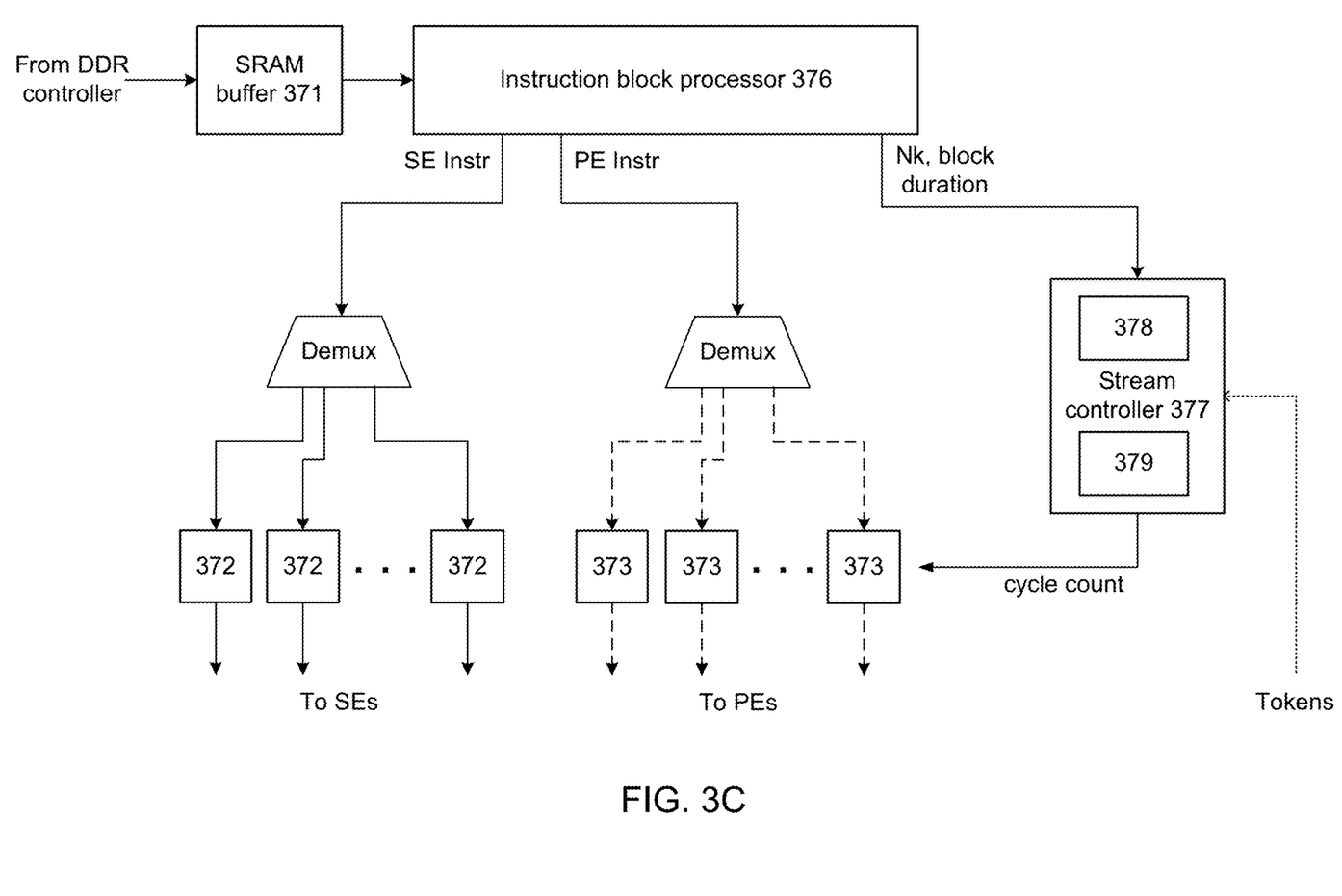
FIG. 3C is a block diagram of an instruction streamer.
Figure 3D:
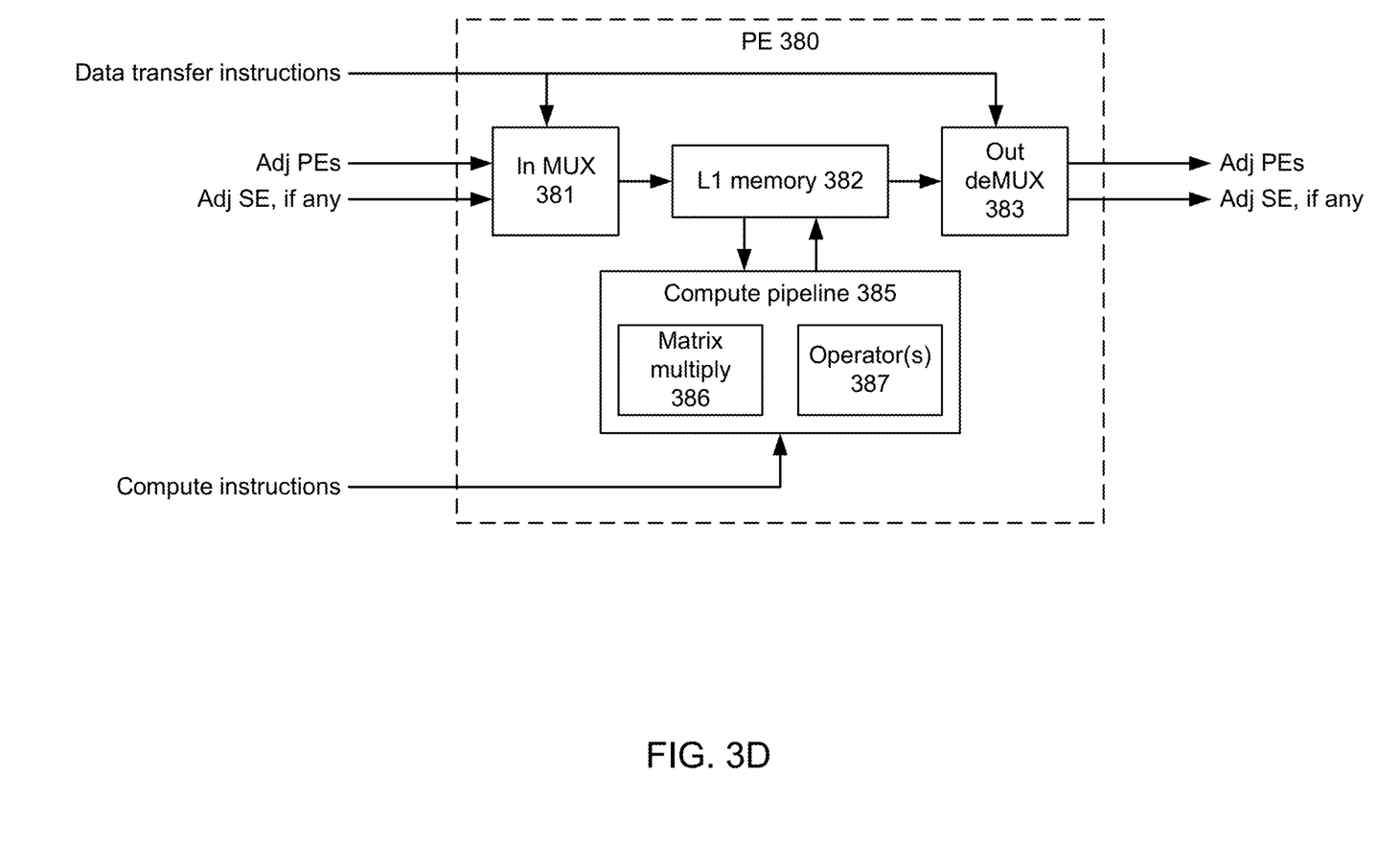
FIG. 3D is a block diagram of a PE within the MLA.
Figure 4:
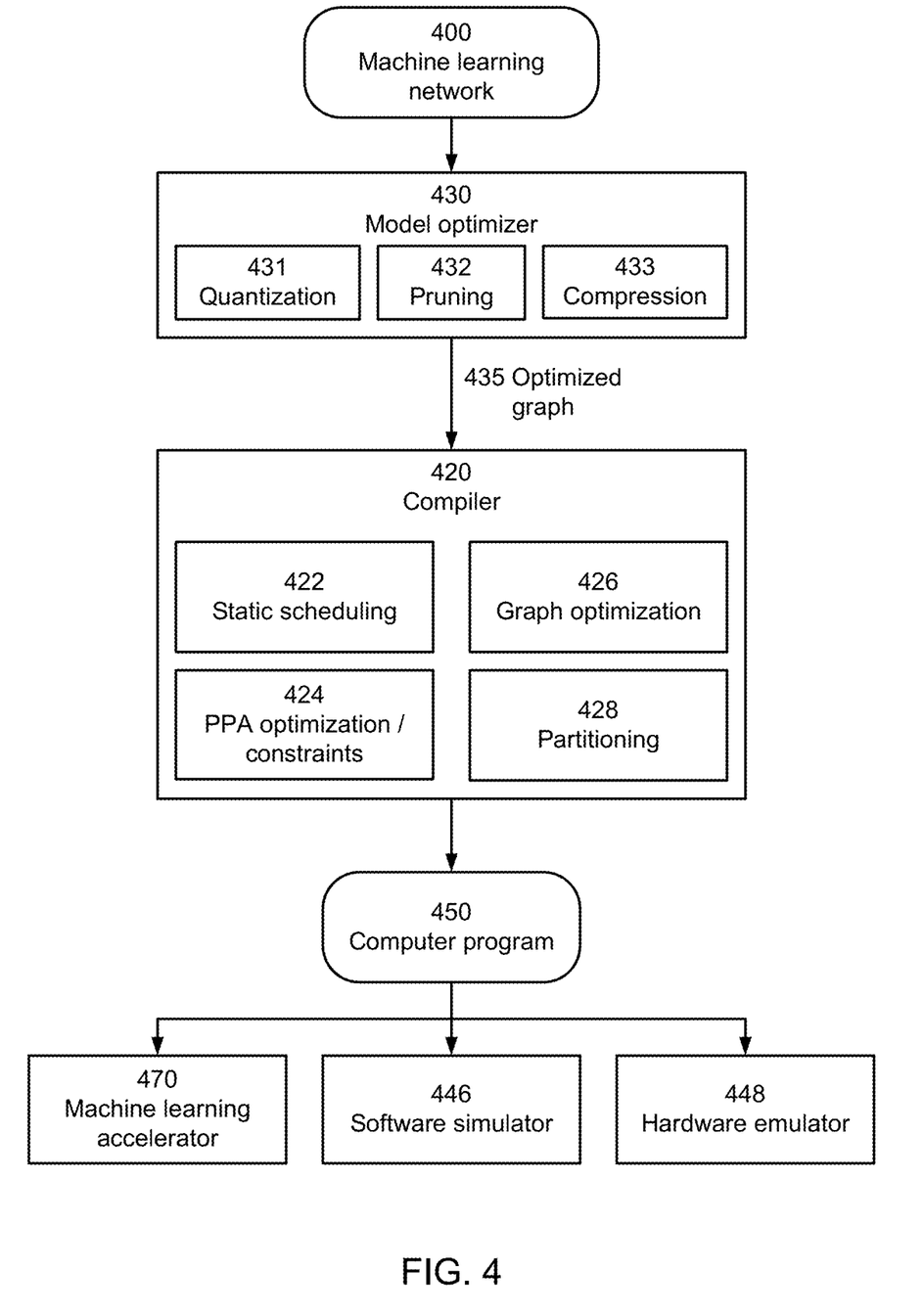
FIG. 4 is a block diagram of a software development environment including a machine learning (ML) compiler.

FIGS. 2-4 are more detailed descriptions of an example system that includes an MLA and corresponding compiler. FIGS. 2-3 show the hardware component and FIG. 4 shows the software development environment.

FIG. 2 is a block diagram of a hardware system including an MLA 270. The MLA 270 includes all the components shown in FIG. 2A, except the off-chip L3 memory 290. The MLA components are implemented on a single die as part of a single chip. The MLA 270 includes one or more mosaics 272A-N. In this example, all of the mosaics are the same. Each mosaic 272 includes a mesh of processing elements (PEs or Tiles) 280, an on-chip memory system and a controller 273. In FIG. 2, the on-chip memory system is a multi-level memory system, which includes a level 1 (L1) memory distributed among the Tiles (see FIG. 3C) and a level 2 (L2) memory 274 shared by the Tiles. The L2 memory 274 includes storage elements SEs. If there are multiple mosaics 272, the MLA 270 may include a dedicated interconnect 279 for connecting the different mosaics. Each mosaic also includes an interface 278 to the interconnect 279.

FIGS. 3A-3D are block diagrams of example components within the MLA. FIG. 3A is a block diagram of an instruction streamer, processing elements (PEs) and storage elements (SEs) within an MLA. The PEs are arranged as a two-dimensional array, and the SEs are arranged as a ring around the outer edge of the PEs. Data can be transferred as follows, as shown in FIG. 3A. Within the mesh of PEs and SEs, data may be transferred between neighboring elements, whether they are PEs or SEs. This is indicated by the dashed arrows. In this particular architecture, data may also be transferred by daisy chain, as described in further detail below. Data transfer to and from off-chip memory (e.g., DRAM) is via the DDR controller 392. In this particular architecture, only one SE along each edge has direct accesses the DDR controller 392, as indicated by the solid arrows from the DDR controller 392. The remaining SEs have daisy-chained access to DRAM, as indicated by the solid arrows between SEs.

Instruction transfer from instruction streamer 375 is implemented by daisy chain, as shown in FIG. 3B. The instruction streamer 375 provides direct transfer to one SE along each edge and to one PE at the head of each column, as indicated by the solid arrows from the instruction stream 375 for SEs and the dashed arrows for PEs. These instructions may be passed to other SEs or PEs, as indicated by the arrows between SEs and between PEs. Tokens are provided by the SEs back to the instruction streamer 375 via the dotted daisy chain paths.

FIG. 3C is a block diagram of the instruction streamer 375, including the block processor 376 and stream controller 377. Blocks retrieved from the DRAM are buffered in SRAM 371. The block processor 376 processes these blocks as follows. SE instructions are sent to SE queues 372 and PE instructions are sent to PE queues 373. The instructions are held in queue until the block is permitted to start execution. There are multiple queues, so that instructions for multiple blocks may be queued concurrently. The block duration and token count Nk are sent to the streaming controller 377. In one implementation, a table 378 handles the token counting. Tokens for multiple blocks may be counted concurrently. Tokens from the SEs are received by the token table 378. When the token count reaches Nk for a block, the streaming controller 377 knows that this condition for execution of block k has been met. There may be other conditions for execution of a block. For example, the execution of the prior block (referring to the statically scheduled instructions in the block) must complete before execution of the current block begins. The streaming controller 377 uses the block duration to determine when a block has completed execution. Another condition is that the instructions for the block must be available in the SE and PE queues and the SRAM buffer.

In this example, the streaming controller 377 produces a cycle count for release of the instructions from the queues. Referring to the example of FIG. 1C, once the conditions for Block 2 have been met, a local counter 379 in the streaming controller starts a cycle count. Instruction 1 is released from the queue at cycle 1, instruction 2 at cycle 1, instruction 3 at cycle 5, etc.

Other architectures will be apparent. For example, instructions in a block could be forwarded and stored in the PEs and SEs rather than in queues within the instruction streamer. Execution of the instructions may be triggered by a pulse or other signal to the PEs/SEs.

FIG. 3D is a block diagram of a PE 380 within the MLA. In this example, all the Tiles are similar. Each Tile 380 includes an L1 memory 382. Each Tile 380 also includes a data transfer pipeline that executes instructions for transferring data to and from the L1 memory 382. Here, the Tiles 380 are arranged in a rectangular array as shown in FIG. 3A, with each Tile connected to its adjacent neighbors. Interior Tiles are connected to four adjacent Tiles. Edge Tiles are connected to adjacent Tiles and also to SEs 374. In FIG. 3D, the L1 memory 382 may receive data from any of its adjacent Tiles and/or from a SE if it is an edge Tile. Similarly, it may transfer data to any of its adjacent Tiles and/or to an SE if it is an edge Tile. The data transfer operations are controlled by data transfer instructions received and executed by the Tiles.

Each Tile 380 also includes a compute pipeline 385 for executing computations using data stored in the L1 memory 382. The L1 memory acts as software-configurable registers for the compute pipeline 385. The compute pipeline 385 includes matrix multiplication circuitry 386, such as a systolic array, and circuitry for implementing different types of operators 387. The computations are controlled by compute instructions received and executed by the Tiles.

In this particular example, all of the data transfer instructions and compute instructions executed by the Tiles are statically scheduled. These instructions include data transfer between L1 memories in different Tiles, and data transfer between L1 memory and L2 memory (SEs). Data transfer instructions may specify one hop at a time (e.g., transfer data to the east neighbor Tile) or may specify destination and path through intermediate Tiles (e.g., transfer data to Tile (5,5) using path east-east-north-north-east). The instructions also include matrix multiplies performed by the Tiles and operators applied by the Tiles. These operations do not require very many different instructions to implement, so the overall instruction set may be fairly small, for example not more than 30 instructions, or not more than 50 instructions.

The L3 memory 290 of FIG. 2 is off-chip. In this example, the L1 and L2 memories (SEs) are implemented as on-chip SRAM and the L3 memory is implemented as DRAM (flash memory and SSD drives are other alternatives). Because the L1 and L2 memories are implemented as SRAM, the data transfers between L1 memories or between L1 and L2 memories have deterministic timing, so these data transfer instructions can be statically scheduled by the compiler.

In one approach, the instructions in the computer program and the data required for computation (e.g., input, weights, biases, parameters for operators) are initially loaded into L3 memory. From time to time, data is transferred from L3 memory into L1/L2 memory using blocks as described above. Once this data is loaded into L1/L2 memory, the Tiles execute the corresponding instructions according to a static schedule.

The approach based on static scheduling described above is not restricted to the examples described above. For example, different network topologies of Tiles and storage elements may be used.

FIG. 4 is a block diagram of a software development environment including a machine learning (ML) compiler 420. In this example, the software development environment also includes a model optimizer 430. The model optimizer 430 receives a description of the MLN 400 and produces an optimized graph 435 of the MLN. It may apply optimizations such as quantization 431, pruning 432 and/or compression 433. Quantization 431 reduces the resolution of calculated values. For example, floating point values may be quantized to a certain number of bits and then integer math used instead of floating point math. This reduces the complexity and power consumed by the Tiles. Pruning 432 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 435 of the MLN may be expressed as a graph, in which the nodes of the graph represent nodes in the MLN and the edges of the graph represent the weighted interconnects. The compiler 420 receives the optimized graph 435 and produces the resulting computer program 450. The compiler 420 may perform operations including static scheduling 422, PPA (power performance area) optimizations 424, graph optimizations 426 and/or partitioning 428.

In order to statically schedule 422 the deterministic instructions, the compiler typically will know the duration of each instruction (i.e., how long each instruction takes to execute), the capabilities of each element (which processing elements and storage elements can execute which instructions), the topology of data transfer paths to and from Tiles (including between Tiles, and between Tiles and on-chip memory), and the computations required and their dependencies (i.e., the MLN description). With this information, the compiler can schedule unconditional start times for the deterministic instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

PPA optimization 424 includes different optimizations of the computer program 450. For example, the allocation of MLN computations to Tiles may be optimized to reduce power consumption, to increase performance (such as reducing latency or increasing throughput) and/or to reduce area (e.g., number of Tiles used). The compiler 420 may also optimize 424 the computer program 450, subject to constraints on power, performance, area and/or any of the quantities described above. Graph optimization 426 includes analysis of the graph representing the MLN to prune, merge or quantize links, parameters, values, and layers to achieve better performance. Partitioning 428 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 450 may be loaded into memory for execution on a machine learning accelerator 470. For example, one possible application is object detection. In this case, the inputs are images captured by a video camera. The MLN 400 has been trained to identify certain objects in the video images. The computer program 450 implementing the MLN is loaded onto memory that is accessible by the MLA 470, which is implemented as a chip inside the camera. This way, images captured by the video camera may be immediately analyzed by the computer program 450 running on the MLA 470.

In addition to the MLA 470, the computer program 450 or parts of it may be run on a software simulator 446 and/or hardware emulator 448 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

Figure 5:
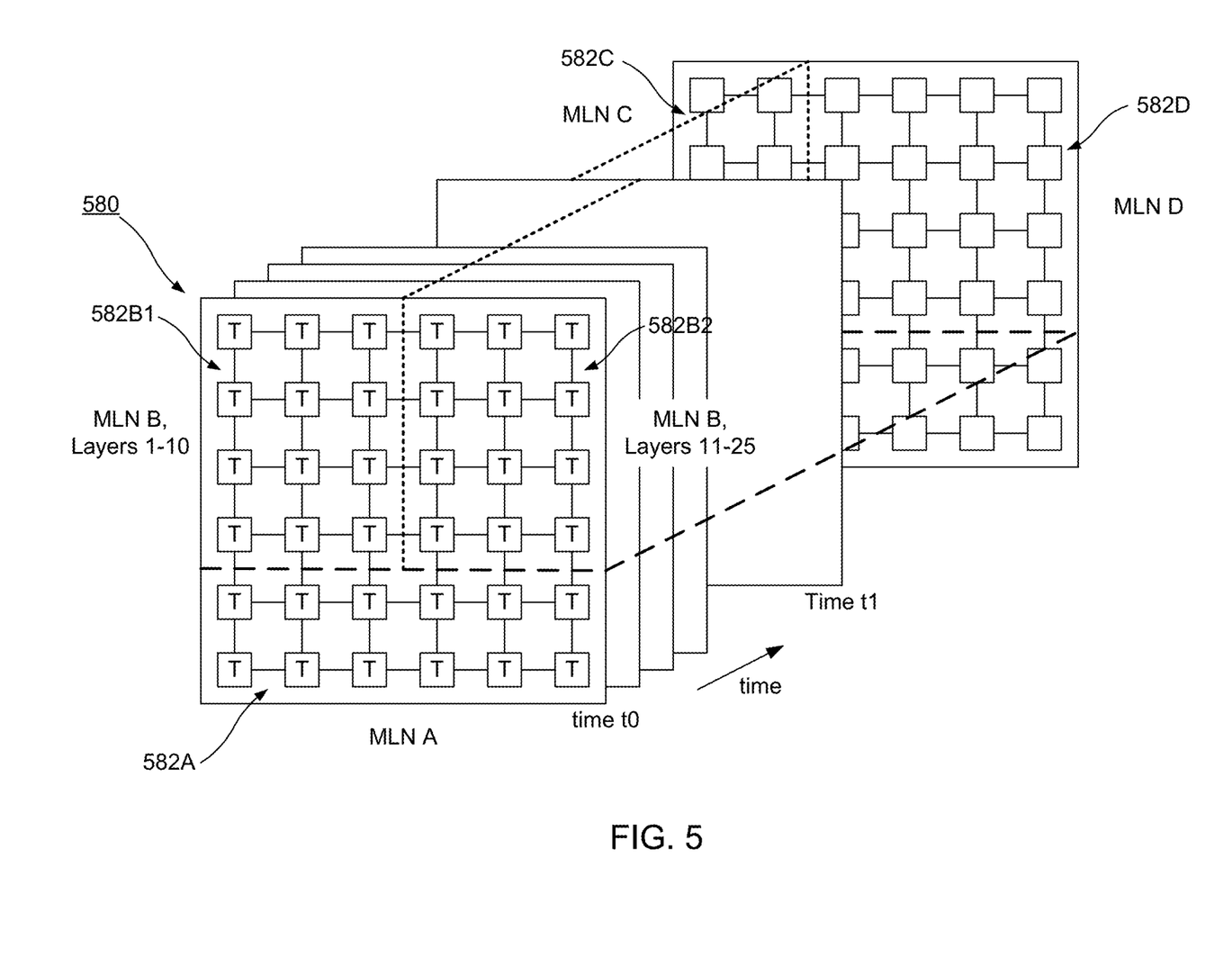
FIG. 5 is a block diagram of an MLA with a 6×6 mesh of Tiles.

The embodiments described above may be used to execute a single MLN. However, the MLA is enabled to execute multiple MLNs. FIG. 5 illustrates partitioning the mesh of Tiles to different subnets of an MLN and to different MLNs. In FIG. 5, the MLA includes a 6×6 mesh (element 580 in FIG. 5A). From time t0 to t1, the mesh 580 is utilized to implement two different MLNs: MLN A and MLN B. The Tiles are divided into three partitions 582A, 582B1, and 582B2. Partition 582A implements MLN A, partition 582B1 implements the first 10 layers of MLN B, and partition 582B2 implements the remaining 15 layers of MLN B. MLN B may be partitioned in this manner because some off-Tile operations may be required between layers 10 and 11. May be the output of layer 10 requires a computation that is performed off-Tile in a non-deterministic manner, or may be layers 11-25 require data that cannot be loaded in a manner consistent with the static scheduling of layers 1-10. After time t1, the mesh 580 continues to implement MLN B using partition 582A, but MLN A is replaced by MLNs C and D using partitions 582C and 582D, respectively.

FIG. 5 shows a progression over time. The front diagram shows the partitioning at an earlier time and the subsequent diagrams show the partitioning at later times. The times are indicated to the lower right of the diagrams. At time to, the mesh is partitioned so that the bottom 2×6 Tiles implement MLN A, the upper left 4×3 Tiles implement MLN B layers 1-10, and the upper right 4×3 Tiles implement MLN B layers 11-25. At time t1, MLN B is no longer required and is replaced by MLNs C and D. 11-25. The upper left 4×2 Tiles now implement MLN C, and the upper right 4×4 Tiles now implement MLN D.

Figure 6:
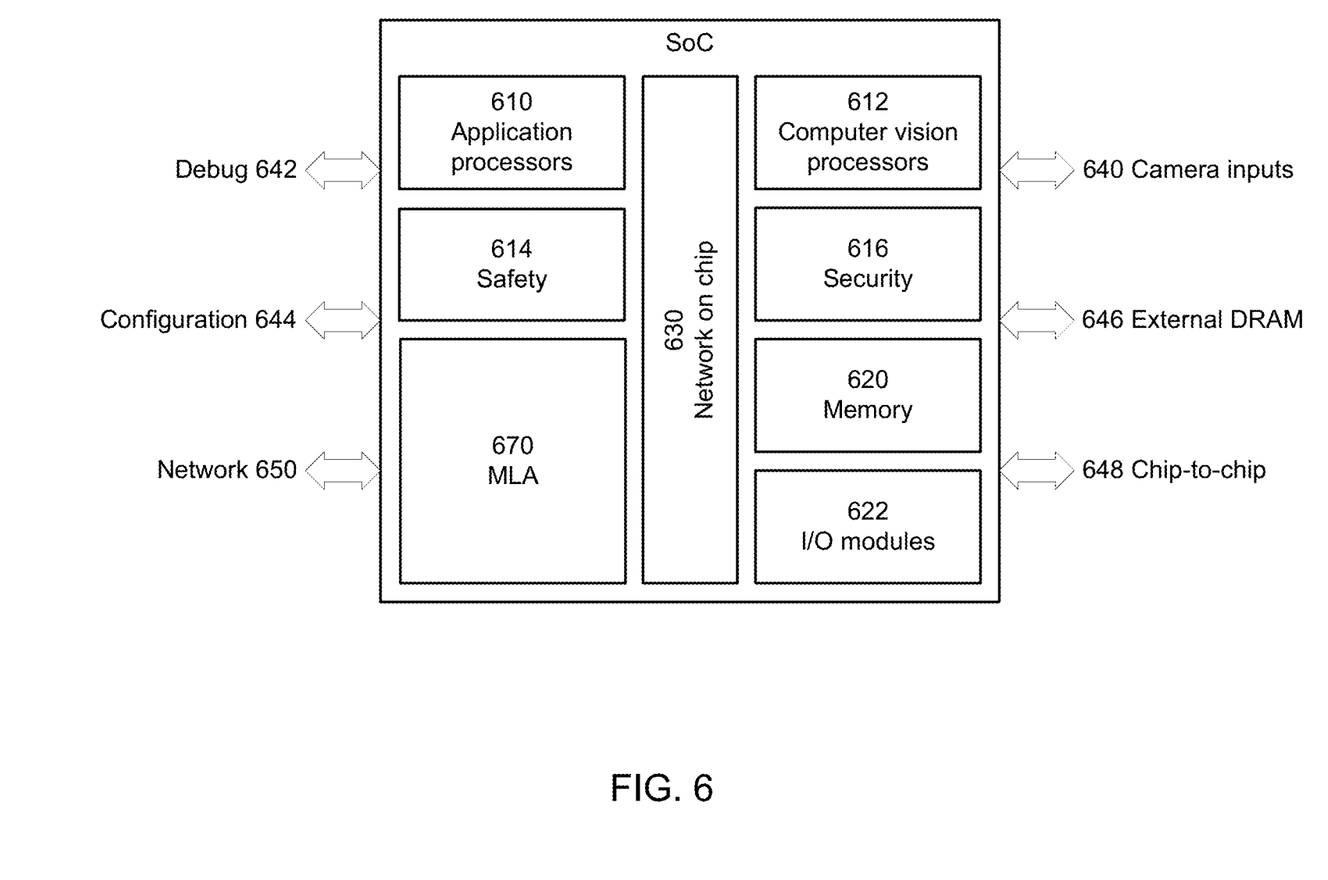
FIG. 6 is a block diagram of an integrated circuit that includes an MLA.

As discussed above, the MLA includes various components that are on the same die. The MLA may be integrated into a larger integrated circuit product (e.g., as part of an edge device). FIG. 6 is a block diagram of an integrated circuit that includes an MLA 670. Other components may be included on the same die as the MLA. This example includes the following additional blocks: application processor 610 (e.g., general purpose CPU running applications), computer vision processor 612 (or other types of application-specific processors), safety 614, security 616, additional SRAM (memory) 620 and input/output circuitry 622. It also includes a network 630 for communication between the different components. This type of semiconductor chip may be referred to as a system-on-chip (SoC).

The connections to the external world include camera inputs 640 for the computer vision processors, ports for debug 642 and configuration 644, a connection 646 to external memory (e.g., DRAM), chip-to-chip connections 648, and network connections 650 (e.g., Ethernet and PCIe).

The SoC of FIG. 6 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 612, which perform initial operations such as edge detection and enhancement, contrast enhancement, motion detection, and optical flow. Raw and/or processed images may be then input to the MLA 670 for analysis by the machine learning network. The MLA may also receive other inputs, such as metadata from other sources and data from other sensors. The application processors 610 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a speed of at least 50 TOPs (50 trillion operations per second) at a power consumption of not more than 5 watts. The speed may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for implementing a machine learning network by executing a computer program of instructions on a machine learning accelerator (MLA) comprising a plurality of interconnected storage elements (SEs) and processing elements (PEs), the instructions partitioned into blocks, the method comprising:
retrieving a block k of instructions from off-chip memory, the block (a) comprising a set of statically scheduled deterministic instructions executed by the SEs and PEs, and (b) specifying a number Nk of non-deterministic instructions for block k that must execute prior to executing the block k of instructions, wherein the non-deterministic instructions are contained in prior blocks;
keeping a count of the number of non-deterministic instructions for block k executed; and
executing the block k of instructions, only after the count of executed non-deterministic instructions for block k has reached Nk, wherein an execution order of the statically scheduled deterministic instructions in the block k does not change as a result of run-time conditions, branching or dependence on input values.

2. The method of claim 1 wherein the SEs execute the non-deterministic instructions.

3. The method of claim 2 wherein the non-deterministic instructions comprise instructions to retrieve data from off-chip memory for use by the set of deterministic instructions of block k.

4. The method of claim 3 wherein the SEs retrieve data by direct requests to the off-chip memory.

5. The method of claim 1 wherein keeping a count of the number of non-deterministic instructions executed comprises:
  creating a token when a non-deterministic instruction for block k is executed; and
  keeping a count of the number of tokens for block k.

6. The method of claim 1 wherein the block k of instructions further comprises (c) non-deterministic instructions for later blocks.

7. The method of claim 1 wherein the number Nk is contained in a header for the block k of instructions.

8. The method of claim 1 further comprising:
  queuing deterministic and non-deterministic instructions for execution by SEs and queuing deterministic instructions for execution by PEs.

9. The method of claim 8 wherein the block k is executed, also only after the instructions in the block k have been queued.

10. The method of claim 1 wherein the deterministic instructions executed by PEs comprise instructions to perform computations using data in the PEs and instructions to transfer data to and/or from the PEs.

11. The method of claim 1 wherein the deterministic instructions executed by SEs comprise instructions to transfer data between the SEs and either the PEs or other SEs.

12. The method of claim 1 wherein the block k is executed, also only after a prior block has finished execution.

13. The method of claim 12 wherein the block k of instructions further comprises (c) a duration for execution of the set of deterministic instructions in the block k.

14. A system comprising a machine learning accelerator (MLA) implemented on a semiconductor die, the MLA comprising:
  a mesh of interconnected storage elements (SEs) and processing elements (PEs) configured to execute a program of instructions to implement a machine learning network, the instructions partitioned into blocks; and
  an instruction streamer coupled to the mesh and to off-chip memory, the instruction streamer comprising:
    a buffer that stores a block k of instructions retrieved from the off-chip memory, the block of instructions (a) comprising a set of statically scheduled deterministic instructions executed by the SEs and PEs, and (b) specifying a number Nk of non-deterministic instructions for block k that must execute prior to executing the block k of instructions, wherein the non-deterministic instructions are contained in prior blocks;
    a set of counters that keep a count of the number of non-deterministic instructions executed for different blocks; and
    a stream controller that begins execution of the block k of instructions, only after the count of executed non-deterministic instructions for block k has reached Nk, wherein an execution order of the statically scheduled deterministic instructions in the block k does not change as a result of run-time conditions, branching or dependence on input values.

15. The system of claim 14 wherein the counters receives tokens created when non-deterministic instructions are executed and the counters keep counts of the number of tokens received for the different blocks.

16. The system of claim 15 wherein the non-deterministic instructions comprise instructions executed by SEs to retrieve data from off-chip memory for use by the set of deterministic instructions of block k, and the SEs create tokens when the non-deterministic instructions are executed and send the tokens to the counter.

17. The system of claim 14 wherein the instruction streamer further comprises:
  a first set of queues for queuing instructions for execution by SEs; and
  a second set of queues for queuing instructions for execution by PEs.

18. The system of claim 14 wherein the PEs are arranged as a two-dimensional array of interconnected PEs, and the SEs are arranged as one-dimensional arrays of SEs interconnected to the PEs along each edge of the two-dimensional array of PEs.

19. The system of claim 14 wherein the stream controller further comprises:
  a local counter that controls timing of execution of the set of statically scheduled deterministic instructions.

20. The system of claim 14 wherein the non-deterministic instructions comprise instructions to retrieve data from off-chip DRAM for use by the set of deterministic instructions of block k, and the SEs comprise SRAM for storing the retrieved data.

* * * * *